United States Patent
Dahm et al.

(10) Patent No.: US 6,437,056 B1
(45) Date of Patent: Aug. 20, 2002

(54) COATING OF CARBOXYL (METH)ACRYLIC COPOLYMER OR POLYESTER AND UREA ANTI-SAG AGENT PREPARED IN POLYEPOXIDE

(75) Inventors: Ralf Dahm, Wermelskirchen; Carmen Flosbach, Wuppertal; Hermann Kerber, Wuppertal; Walter Schubert, Wuppertal; Astrid Tückmantel, Wuppertal, all of (DE)

(73) Assignee: E. I. du Pont de Nmeours and Company, Wilmington, DE (US)

( * ) Notice: Subject to any disclaimer, the term of this patent is extended or adjusted under 35 U.S.C. 154(b) by 0 days.

(21) Appl. No.: 09/622,757

(22) PCT Filed: Mar. 5, 1999

(86) PCT No.: PCT/EP99/01552
§ 371 (c)(1),
(2), (4) Date: Dec. 11, 2000

(87) PCT Pub. No.: WO99/27012
PCT Pub. Date: Sep. 16, 1999

(30) Foreign Application Priority Data

Mar. 10, 1998 (DE) .......................... 198 10 220

(51) Int. Cl.$^7$ .................. C08L 33/02; C08L 33/14; C08L 63/00; C08L 67/02; C08L 75/04

(52) U.S. Cl. .................. 525/438; 525/108; 525/110; 525/111; 525/114; 525/117; 525/118; 525/119; 525/124; 525/125; 525/127; 525/128; 525/161; 525/162; 525/163; 525/166; 525/170; 525/207; 525/208; 525/454; 523/456

(58) Field of Search ................. 525/438, 108, 525/110, 111, 114, 117, 118, 119, 124, 125, 127, 128, 161, 162, 163, 166, 170, 207, 208, 454; 523/456

(56) References Cited

U.S. PATENT DOCUMENTS 3,893,956 A * 7/1975 Brandt ....................... 117/161
4,311,622 A * 1/1982 Buter ......................... 525/128
4,371,667 A * 2/1983 Moller et al. ................ 525/208
4,383,068 A * 5/1983 Brandt ....................... 524/196
4,677,028 A * 6/1987 Heeringa et al. ............ 524/376
4,851,294 A * 7/1989 Buter et al. ................. 525/123
5,391,620 A * 2/1995 Bederke et al. ............. 525/123
5,686,532 A * 11/1997 Bederke et al. ............. 525/438
6,080,296 A * 6/2000 Lieverz et al. .............. 204/488

FOREIGN PATENT DOCUMENTS

| DE | 4310413 A | * 10/1994 |
| EP | 442336 A | * 8/1995 |
| JP | 05-132636 A | * 5/1993 |
| JP | 05-247387 A | * 9/1993 |
| WO | WO 95/27012 A1 | * 10/1995 |

* cited by examiner

Primary Examiner—Robert E. L. Sellers
(74) Attorney, Agent, or Firm—Sudhir G. Deshmukh

(57) ABSTRACT

Coating composition suitable for multilayer lacquering, containing, in addition to organic solvent, anti-sagging agents, optionally pigments, extenders and additives, a binder/crosslinkin agent system containing A) from 20 to 80 wt. % of carboxyl-functional (meth) acrylic copolymers and/or carboxyl-functional polyesters having an acid number of from 20 to 300, B) from 20 to 80 wt. % of epoxy-functional crosslinking agents, the percentages by weight of A) and B) adding up to 100 wt. %.

C) from 0 to 30 wt. % of polymer polyol C), based on the sum of the weights of A) and B), E) from 0 to 20 wt. % of further crosslinking agents, based on the sum of the weights of A, B, and C), F) from 0 to 10 wt. % of monoepoxides, based on the sum of the weights of A) and B), and D) as anti-sagging agents, from 0.1 to 3 wt. %, based on the resin solids, of solid, finely divided urea compounds D) which have previously been prepared in the presence of at least a portion of the epoxy-functional crosslinking agent B) and which are insoluble in the coating compositions, all percentages are by weight being based in each case on the solids.

5 Claims, No Drawings

COATING OF CARBOXYL (METH)ACRYLIC COPOLYMER OR POLYESTER AND UREA ANTI-SAG AGENT PREPARED IN POLYEPOXIDE

The invention relates to coating compositions and their use in the production of multilayer lacquer coatings, for example in the automotive sector, especially in the production of two-layer lacquer coatings of the base lacquer/clear lacquer type.

Coating compositions that are based on a combination of an epoxy-functional component and a carboxyl-functional component and that cure with the formation of esters are known. They are distinguished by the fact that the coatings produced therefrom and stoved have good resistance to chemicals and acids, and they are therefore especially suitable as clear lacquers or finishing lacquers in the series lacquering of motor vehicles.

For example, there is known from DE-A-30 22 996 a stoving lacquer in which polymers containing carboxyl groups, such as, for example, (meth)acrylic copolymers based on acrylic acid or methacrylic acid, and acrylate resins containing glycidyl groups are mixed to form a curable composition.

DE-A-42 37 658 also describes stoving lacquer systems based on components containing carboxyl groups and components containing epoxy groups. In this case, the carboxyl groups are chain-lengthened with lactone in order to increase the reactivity.

The visual aesthetic effect of base lacquer/clear lacquer two-layer lacquer coatings is influenced essentially by the quality of the clear lacquer layer. Ideally, the structure of the clear lacquer layer is the same on horizontal and vertical surfaces of a three-dimensional substrate, for example a motor vehicle body. However, the described ideal case cannot readily be achieved in practice. For example, differences in the surface structure or in the flow of the outer clear lacquer layer may occur since, after application and especially during the heating phase of the stoving process, the clear lacquers tend to run or sag on surfaces that are outside the horizontal as a result of a temperature-related fall in the viscosity. That risk is greater, the greater the thickness of the clear lacquer layer.

It is known from DE-C-27 51 761 and EP-A-0 198 519 to use particular urea compounds as additives in aminoplastic-resin-curing stoving lacquers based on hydroxyl-functional binders, in order to counteract undesired sagging phenomena of the lacquer on stoving. It is additionally known from EP-A-0 192 304 to use urea compounds as anti-sagging agents in lacquers that contain hydroxyl-functional binders and aminoplastic resins or free or blocked polyisocyanates as crosslinking agents. The resistance to chemicals, especially the resistance to acids, of the stoved coating layers produced from those coating compositions is in need of improvement.

The object of the invention is to provide coating compositions that exhibit a reduced tendency to sag even when applied in relatively great layer thicknesses and that, in the stoved state, result in coatings having good resistance to acids and chemicals. The coating compositions are to be suitable especially as stoving coating compositions for the production of the outer clear lacquer or finishing lacquer layer of a multilayer lacquer coating.

The object is achieved by means of curable coating compositions containing binders and crosslinking agents, one or more organic solvents, anti-sagging agents and, optionally, pigments and/or extenders and, optionally, further additives conventionally employed in lacquers, wherein there are present as binders from 20 to 80 wt. % of one or more carboxyl-functional components A) selected from carboxyl-functional (meth)acrylic copolymers and/or carboxyl-functional polyesters, the carboxyl functionality of which corresponds in each case to an acid number of from 20 to 300 mg of KOH/g, and from 20 to 80 wt. % of one or more epoxy-functional crosslinking agents B), the percentages by weight adding up to 100 wt. % which coating compositions are characterised in that they contain as anti-sagging agents from 0.1 to 3 wt. % based on the resin solids, of one or more solid urea compounds D) which have previously been prepared in the presence of at least a portion of the epoxy-functional crosslinking agent(s) B) and which are insoluble in the coating composition, all percentages by weight in each case being based on the solids content.

The binder/crosslinking agent system of the coating compositions according to the invention contains components A) and B) as the essential components and, if desired, the optional components C) and/or E) and/or F) mentioned below. For example, the coating compositions according to the invention may contain only components A) and B) as the binder/crosslinking agent system, or the binder/crosslinking agent system of the coating compositions according to the invention additionally contains the optional components C) and/or E) and/or F). The resin solid of the coating compositions according to the invention is formed from the sum of the resin solids or the non-volatile portions of components A), B) and the optional components C), E) and F) mentioned below.

Curing of the coating compositions according to the invention is based on the chemical reaction which takes place during stoving between the groups of components A) and B) that are complementarily reactive with respect to one another; it is an addition of the carboxyl groups to the epoxy groups with formation of carboxylic acid ester compounds.

The present invention provides curable coating compositions with which the stated object can be achieved. It was in no way to be expected that the object would be successfully achieved when the synthesis of the urea compounds D) from corresponding amine and isocyanate compounds, as discussed in greater detail below, is carried out in the presence of epoxy-functional crosslinking agents B). Surprisingly, the object is successfully achieved even though the urea compounds D) are prepared in the presence of epoxy-functional crosslinking agents B) that are reactive towards amine compounds. It is advantageous that the epoxy-functional crosslinking agents B), which are themselves a constituent of the coating composition according to the invention, can be used as the reaction medium for the synthesis of the urea compounds D). It is not necessary to synthesise the urea compounds D) in a separate reaction medium, addition of which to the binder/crosslinking agent system containing components A) and B) of the coating compositions according to the invention would possibly be undesirable and optionally even have an adverse effect.

The coating compositions according to the invention contain as component A) one or more carboxyl-functional components A). The carboxyl-functional component A) of the coating compositions according to the invention is carboxyl-functional (meth)acrylic copolymers and/or carboxyl-functional polyesters, the carboxyl functionality of which corresponds in each case to an acid number of from 20 to 300 mg of KOH/g. The carboxyl-functional (meth)acrylic copolymers and/or carboxyl-functional polyesters may be urethanised and/or modified by reaction with lactones.

The carboxyl-functional (meth)acrylic copolymers of component A) optionally containing urethane groups preferably have a number-average molecular weight (Mn) of from 1000 to 30,000 g/mol. The carboxyl-functional polyesters of component A) optionally containing urethane groups preferably have a calculated molecular weight of from 500 to 4000 g/mol. The acid number is in each case from 20 to 300 mg of KOH/g, preferably from 30 to 250 mg of KOH/g.

In the preparation of the carboxyl-group-containing (meth)acrylic copolymers or polyesters of component A), each of which may optionally contain urethane groups, the carboxyl groups may be introduced directly by the use of structural units containing carboxyl groups. Examples of suitable monomers containing carboxyl groups that may be used for the synthesis of carboxyl-group-containing (meth) acrylic copolymers are unsaturated carboxylic acids, such as, for example, acrylic, methacrylic, itaconic, crotonic, isocrotonic, aconitic, maleic and fumaric acid, half-esters of maleic and fumaric acid, and carboxyalkyl esters of (meth) acrylic acid, for example beta-carboxyethyl acrylate and adducts of hydroxyalkyl (meth)acrylates with carboxylic acid anhydrides, such as, for example, phthalic acid mono-2-(meth)acryloyloxyethyl ester.

In the present description and the patent claims, the term (meth)acrylic is used. This means acrylic and/or methacrylic.

In the preparation of (meth)acrylic copolymers or polyesters of component A) containing carboxyl groups and optionally containing urethane groups, it is, however, also possible first to synthesise a polymer containing hydroxyl groups and optionally already also carboxyl groups and to introduce some or all of the carboxyl groups in a second step by reaction with carboxylic anhydrides. In that procedure, it is possible to use such relative proportions that, if necessary, sufficient hydroxyl groups remain to allow urethanisation to be carried out.

Carboxylic acid anhydrides suitable for addition to the hydroxyl-group-containing polymers, which may already contain carboxyl groups, are the anhydrides of di- and poly-carboxylic acids, such as, for example, preferably phthalic, tetrahydro-, methylhexahydro- and hexahydrophthalic anhydride.

Monomers suitable for the introduction of hydroxyl groups into the (meth)acrylic copolymers of component A) optionally containing urethane groups are, for example, hydroxylalkyl (meth)acrylates, such as, for example, hydroxyethyl (meth)acrylate, as well as the hydroxypropyl (meth)acrylates and hydroxybutyl (meth)acrylates which are isomeric with respect to the position of the hydroxyl group.

There may also be used as the hydroxyl-functional component at least partly a reaction product of (meth)acrylic acid with the glycidyl ester of a carboxylic acid having a tertiary alpha-carbon atom. Glycidyl esters of highly branched monocarboxylic acids are obtainable, for example, under the trade name "Cardura". The reaction of the acrylic acid or methacrylic acid with the glycidyl ester of a carboxylic acid having a tertiary alpha-carbon atom may take place before, during or after the polymerisation reaction.

In the preparation of the (meth)acrylic copolymers of component A) it is possible to use in addition to the above-mentioned monomers also further olefinically unsaturated monomers, especially those which contain no further functional groups besides an olefinic double bond. The choice of the further olefinically unsaturated monomers is not critical; the olefinic monomers with or without further functional groups conventionally employed for polymerisation may be used. The monomers are preferably so chosen in the manner known to the person skilled in the art that their incorporation does not lead to undesirable properties of the copolymer.

There are suitable as further olefinically unsaturated monomers, for example, especially alkyl esters of (meth) acrylic acid, such as, for example, methyl (meth)acrylate, ethyl (meth)acrylate, propyl (meth)acrylate, butyl (meth) acrylate, isopropyl (meth)acrylate, isobutyl (meth)acrylate, tert.-butyl (meth)acrylate, hexyl (meth)acrylate, cyclohexyl (meth)acrylate, 2-ethylhexyl (meth)acrylate, decyl (meth) acrylate, hexadecyl (meth)acrylate.

Instead of the above-mentioned (meth)acrylic acid alkyl esters or together therewith, further olefinically unsaturated monomers may be used for the preparation of (meth)acrylic copolymers of component A), the choice of those monomers being largely dependent on the desired properties of the coating compositions in respect of hardness, elasticity, tolerability and polarity.

Examples of further suitable olefinically unsaturated monomers are the alkyl esters of maleic, fumaric, tetrahydrophthalic, crotonic, isocrotonic, vinylacetic and itaconic acids, such as, for example, the corresponding methyl, ethyl, propyl, butyl, isopropyl, isobutyl, pentyl, amyl, isoamyl, hexyl, cyclohexyl, 2-ethylhexyl, octyl, decyl, dodecyl esters.

There may also be used small amounts of monomers having at least two polymerisable, olefinically unsaturated double bonds. The amount of those monomers is preferably less than 5 wt. %, based on the total weight of the monomers. Examples of such compounds are hexanediol di(meth) acrylate, ethylene glycol di(meth)acrylate, butanediol di(meth)acrylate, hexamethylenebis(meth)acrylamide, trimethylolpropane tri(meth)acrylate, divinylbenzene and similar compounds.

Monovinylaromatic compounds are a further suitable component. They preferably contain 8 or 9 carbon atoms per molecule. Examples of suitable compounds are styrene, vinyltoluene, alpha-methylstyrene, as well as the isomeric methylstyrenes. Vinyltoluenes and, especially, styrene are preferably used. The use of silane-modified monomers, such as, for example, gamma-methacryloxypropyltrimethoxysilane, is also possible.

The preparation of the (meth)acrylic copolymers of carboxyl-functional component A) is effected by radical copolymerisation. It may prove advantageous to add some of the monomers in a manner that is staggered in terms of time.

For the preparation of the (meth)acrylic copolymers of component A), the monomers or the monomer mixture used may contain radical initiators. If radical initiators are not contained in the monomer mixture, they may be added to the monomer mixture optionally staggered slightly with respect to one another in terms of time or they may be metered in separately. Polymerisation may then be continued for a prolonged period, for example for several hours. It is then possible to adjust the mixture to a desired solids content, for example of the order of from 30 to 80 wt. %, for example from 50 to 60 wt. %, with a suitable lacquer solvent. The preparation is carried out, for example, as a radical solution polymerisation in the presence of a radical initiator such as is known to the person skilled in the art. Examples of radical initiators are dialkyl peroxides, diacyl peroxides, hydroperoxides, per-esters, peroxide dicarbonates, perketals, ketone peroxides; azo compounds, such as 2,2'-azobis-(2,4-dimethyl-valeronitrile), azo-bis-isobutyronitrile, C—C-cleaving initiators, such as, for example, benzpinacol derivatives.

The polymerisation initiators are generally added, for example, in an amount of from 0.1 to 4 wt. %, based on the amount of monomers originally weighed in.

For the possible urethanisation of the carboxy-functionalised (meth)acrylic copolymers of component A), hydroxyl groups of the carboxyl-functionalised (meth)acrylic copolymers of component A) may be reacted in a further reaction step with mono-, di-, tri- or poly-isocyanates. Examples of isocyanates which can be used for the urethanisation are phenyl isocyanate as well as the polyisocyanates mentioned by way of examples below in the description of the additional crosslinking agents E), and their defunctionalisation products obtainable by reaction with less than stoichiometric amounts, based on the isocyanate content, of monoalcohols. The amount of di-, tri- or poly-isocyanates used for the urethanisation is chosen in the manner known to the person skilled in the art so that gelling is avoided. Of course, it is also possible to urethanise hydroxyl-functional (meth)acrylic copolymers before carboxyl groups are introduced by reaction with acid anhydrides.

The polyesters of component A) containing carboxyl groups and optionally containing urethane groups can be synthesised by conventional methods from aliphatic and/or cycloaliphatic di-, tri- or higher-hydric alcohols, optionally together with monohydric alcohols, and from aliphatic, aromatic and/or cycloaliphatic carboxylic acids, especially dicarboxylic acids, and higher-valent polycarboxylic acids. Examples of suitable alcohols are aliphatic diols, such as ethylene glycol, 1,2-propanediol, 1,3-propanediol, 2,2-diethyl-1,3-propanediol, the isomeric butanediols, 1,5-pentanediol, 3-methyl-1,5-pentanediol, 1,6-hexanediol, 2-ethyl-1,6-hexanediol, 2,2,4-trimethyl-1,6-hexanediol, 1,4-dimethylolcyclohexane, polyhydric aliphatic alcohols, such as glycerol, trimethylolethane, trimethylolpropane, ditrimethylolpropane, pentaerythritol, as well as etherification products of diols and polyols, for example di- and tri-ethylene glycol, polyethylene glycol, neopentyl glycol esters of hydroxypivalic acid.

Examples of suitable carboxylic acids are adipic acid, azelaic acid, 1,3- and 1,4-cyclohexanedicarboxylic acid, tetrahydrophthalic acid, hexahydrophthalic acid, endomethyltetrahydrophthalic acid, the isomeric phthalic acids and their anhydrides and their esterifiable derivatives.

Like the carboxyl-functional (meth)acrylic copolymers of component A) already described, the carboxyl-functional polyesters of component A) may be urethanised. The reaction conditions and the polyisocyanates that can be used are the same as in the case of the (meth)acrylic copolymers. Introduction of the urethane groups is possible by reaction of the carboxyl- and hydroxyl-functional polyesters with mono-, di-, tri- or higher-functional polyisocyanates.

It is also possible to introduce the urethane groups during the synthesis of the polyesters themselves. That is effected by replacing di- or tri-carboxylic acids wholly or partially by di- or tri-isocyanates.

The carboxyl groups of the carboxyl-functional (meth)acrylic copolymers and polyesters of component A) may be "chain-lengthened" with a lactone. The same applies to any hydroxyl groups contained in the (meth)acrylic copolymers and polyesters of component A). The "chain lengthening" is obtained by the addition, which proceeds with ring opening, of lactones to the carboxyl and/or hydroxyl groups. In that process, terminal, exposed carboxyl and/or hydroxyl groups form. Preference is given to the addition of lactones to carboxyl-functional (meth)acrylic copolymers and polyesters of component A) that are free of OH groups. The addition of the lactone is preferably carried out as the last synthesis step in the preparation of component A) in question. An example of a lactone that is particularly preferably used is epsilon-caprolactone.

The curable coating compositions according to the invention contain as component B) one or more epoxy-functional crosslinking agents. A portion or the total amount of the epoxy-functional crosslinking agents B) contained in the coating compositions according to the invention serves as the reaction medium in the preparation of the urea compounds D) discussed below.

The epoxy-functional crosslinking agents B) are, for example, compounds having at least two epoxy functions in the molecule and an epoxy equivalent weight of, for example, from 200 to 700, preferably from 250 to 500 and especially from 300 to 400, in each case based on solid resin. The number-average molecular weight (Mn) is preferably from 200 to 10,000 g/mol. The glass transition temperature is preferably from –20° C. to 70° C., particularly preferably from 0C to 50° C. and more particularly from 5° C. to 40° C. The upper limit is preferably up to 50° C.

Examples thereof are conventional di- or polyepoxides, for example polyglycidyl ethers based on diethylene glycol, dipropylene glycol, polypropylene glycol, bisphenol A or triglycidyl ethers of glycerol.

Further examples of di- or poly-epoxides are those based on di- or poly-glycidyl esters. Examples thereof are reaction products of 1-hydroxy-2,3-epoxypropane with phthalic acid or terephthalic acid to form phthalic acid or terephthalic acid bis(2,3-epoxypropyl ester), or a diglycidyl ether of bisphenol A with trimellitic anhydride to form polyesters, for example having a number-average molecular weight (Mn) of from 500 to 2000.

Preferred components B) are epoxy-functional (meth)acrylic copolymers, especially glycidyl (meth)acrylate copolymers. There may be chosen as the comonomers, for example, (meth)acrylic acid esters, such as, for example, methyl, ethyl, butyl, isobutyl, ethylhexyl, cyclohexyl and/or lauryl (meth)acrylate, (meth)acrylic acid hydroxyalkyl esters, such as, for example, hydroxyethyl and/or hydroxypropyl (meth)acrylate, also styrene, vinyltoluene and/or alpha-methylstyrene, as well as all alpha,beta-unsaturated monomers as have already been described above in connection with component A). The number-average molecular weight (Mn) may be, for example, from 1000 to 10,000, preferably from 2000 to 5000. Further copolymerisable glycidyl-functional monomers are, for example, (meth)allyl glycidyl ether or 3,4-epoxy-1-vinylcyclohexane. The preparation of the copolymers is carried out by means of radical solution polymerisation; it is known to the person skilled in the art and is carried out according to conventional methods.

In the preparation of the coating compositions according to the invention, the relative proportions are preferably so chosen that there is a molar ratio of carboxyl groups to epoxy groups of from 1:3 to 3:1 between the carboxyl-group-containing component A) and the epoxy component B).

The coating compositions according to the invention may contain as a constituent of their binder/crosslinking agent system from 0 to 30 wt. % of one or more polymer polyols C), based on the sum of the weights of components A) and B), in each case based on the solids content.

The polymer polyols C) optionally contained in the coating compositions according to the invention are polymer polyols selected from hydroxyl-functional polyesters, polyurethanes and/or (meth)acrylic copolymers other than components A) and B) which, besides the carboxyl groups or epoxy groups, contain hydroxyl groups. The polymer polyols C) have at least two hydroxyl functions in the molecule. In addition to the hydroxyl groups corresponding to a hydroxyl number of, for example, from 30 to 350 mg of KOH/g, the polymer polyols C) may also contain carboxyl groups corresponding to an acid number of from 0 to less than 20 mg of KOH/g. The polymer polyols C) preferably contain no further functional groups, especially no epoxy groups, besides the hydroxyl groups and the carboxyl groups which may optionally be present.

The polymer polyols C) optionally used in the coating compositions according to the invention are, for example, those having a number-average molar mass (Mn) of from 500 to 10,000 and hydroxy numbers of from 30 to 350, preferably from 50 to 280, mg of KOH/g.

Examples of hydroxy-functional polyester resins or hydroxyl-functional polyurethane resins which may be used as polymer polyols C) in the coating compositions according to the invention are conventional polyester or polyurethane resins, for example those having a number-average molar mass (Mn) of from 500 to 5000, preferably from 1000 to 3000, and hydroxy numbers of from 30 to 350, preferably from 50 to 280, mg of KOH/g.

Examples of hydroxyl-functional (meth)acrylic copolymers which may be used as polymer polyols C) in the coating compositions according to the invention are conventional (meth)acrylic copolymers, for example those having a number-average molar mass (Mn) of from 1000 to 10,000 and hydroxy numbers of from 30 to 300, preferably from 50 to 250, mg of KOH/g. The (meth)acrylic copolymers may have been prepared, for example, in the presence of oligomeric or polymeric polyester and/or polyurethane resins, for example those as mentioned in the two preceding paragraphs.

In addition to components A) and B) and, optionally, C), the coating compositions according to the invention may also contain as a constituent of their binder/cross-linking agent system one or more additional crosslinking agents E) other than A), B) and C), which permit additional crosslinking involving hydroxyl groups, for example the hydroxyl groups optionally present in the binder system and/or formed during stoving in the course of the epoxy/carboxyl addition reaction. The additional crosslinking agents are present in total amounts of from 0 to 20 wt. %, based on the sum of components A) and B) and, optionally, C), in each case based on the solids content.

Examples of additional crosslinking agents E) are aminoplastic resins, especially melamine resins. Examples thereof are melamine resins etherified by butanol or isobutanol, such as, for example, the commercial products Setamin® US 138 or Maprenal® MF 610; melamine resins etherified by both butanol and methanol, such as, for example, Cymel® 254, melamine resins etherified by methanol, such as, for example, Cymel® 325, Cymel® 327, Cymel® 350 and Cymel® 370, Maprenal® MF 927, or melamine resins of the hexamethoxymethylmelamine type, such as, for example, Cymel® 301 or Cymel® 303.

Further examples of additional crosslinking agents E) are triazine-based components that crosslink with the formation of ester groups, especially with the formation of urethane groups (carbamic acid ester groups), such as, for example, preferably tris(alkoxycarbonylamino)triazine.

Further examples of additional crosslinking agents E) are blocked polyisocyanates, which can be prepared from free polyisocyanates by reaction with compounds containing an active hydrogen atom that are removable again under the stoving conditions. Examples of polyisocyanates that can be used are especially cycloaliphatic and aliphatic polyisocyanates, such as tetramethylene diisocyanate, hexamethylene diisocyanate, 2,2,4-trimethylene diisocyanate, cyclohexane 1,3- and 1,4-diisocyanate, isophorone diisocyanate, biscyclohexylmethane diisocyanate.

In addition to those simple isocyanates, isocyanates containing hetero atoms in the radical linking the isocyanate groups are also suitable. Examples thereof are polyisocyanates having carbodiimide groups, allophanate groups, isocyanurate groups, uretdione groups, urethane groups, acylated urea groups and/or biuret groups.

Especially suitable are the known polyisocyanates which are conventionally employed in the production of lacquers, for example modification products of the above-mentioned simple polyisocyanates containing biuret, isocyanurate or urethane groups, especially tris-(6-isocyanatohexyl)-biuret, the isocyanurate derived from isophorone diisocyanate or hexane diisocyanate, or low molecular weight polyisocyanates having urethane groups, as can be obtained by reaction of isophorone diisocyanate, used in excess, with simple polyhydric alcohols having a molecular weight in the range from 62 to 300, especially with trimethylolpropane. Of course, any desired mixtures of the mentioned polyisocyanates may also be used.

Suitable polyisocyanates are also the known pre-polymers having terminal isocyanate groups, as are obtainable especially by reaction of the above-mentioned simple polyisocyanates, especially diisocyanates, with deficient amounts of organic compounds having at least two groups that are reactive towards isocyanate groups. In those known pre-polymers, the ratio of isocyanate groups to hydrogen atoms that are reactive towards isocyanate groups is preferably from 1.05 to 10:1, particularly preferably from 1.1 to 3:1, the hydrogen atoms preferably originating from hydroxyl groups. The nature of the starting materials used in the preparation of pre-polymers having isocyanate groups and the relative proportions thereof are, furthermore, preferably so chosen that the pre-polymers having isocyanate groups have an average NCO functionality of from 2 to 4, preferably from 2 to 3, and a number-average molar mass Mn) of from 500 to 10,000, preferably from 800 to 4000.

There are used as masking agents compounds having an active hydrogen atom, for example selected from CH-acid compounds such as acetylacetone or CH-acid esters such as, for example, acetic acid alkyl esters, malonic acid dialkyl esters, aliphatic or cycloaliphatic alcohols, such as n-butanol, isopropanol, tert.-butanol, furfurol, 2-ethylhexanol, cyclohexanol; oximes, such as methyl ethyl ketoxime, acetone oxime, cyclohexanone oxime, acetophenone oxime, lactams, such as epsilon-caprolactam or 2-pyrrolidone, imidazoles, such as 2-methylimidazole, pyrazoles, such as 2,3-dimethylpyrazole.

Further examples of additional crosslinking agents E) which may be contained in the coating compositions according to the invention are organic compounds having at least two cyclic carboxylic acid anhydride groups per molecule. The content of carboxylic acid anhydride groups (formally calculated as $C_4O_3$, molecular weight=96) in those compounds is preferably from 5 to 88 wt. %, particularly preferably from 6 to 30 wt. %. There are suitable, for example, trimellitic anhydride esters of ethylene glycol, propylene glycol, diethylene glycol, triethylene glycol, neopentyl glycol, glycerol or trimethylolpropane, preferably prepared in a ratio of 1 mol of trimellitic anhydride per mol of hydroxyl groups.

Further suitable polyanhydrides are, for example, benzophenonetetracarboxylic acid dianhydride and 1,2,4,5-benzenetetracarboxylic acid dianhydride.

Particularly preferred polyanhydrides are copolymers of olefinically unsaturated monomers having as a statistical average at least two cyclic carboxylic acid anhydride groups per molecule. They are preferably copolymers of maleic anhydride and/or itaconic anhydride with conventional monomers, as are described by way of examples in connection with component A), for example. Copolymers based on maleic anhydride, styrene and/or alkyl esters of acrylic and/or methacrylic acid are especially suitable. The copolymers preferably have a number-average molecular weight (Mn) of from 1500 to 75,000, particularly preferably from 2000 to 50,000.

The coating compositions according to the invention may also contain as a constituent of their binder/crosslinking agent system from 0 to 10 wt. % of monoepoxy compounds F), based on the sum of components A) and B), in each case based on the solids. The components F) are substances that are substantially non-volatile under the stoving conditions; for example, the volatile portion is preferably less than 1 wt. %, based on the total amount of monoepoxide F). The calculated molar masses of the monoepoxides F) are above 150, and preference is given to such compounds having a number-average molecular weight (Mn) of up to 3000, particularly below 1000. In the case of the low molecular weights, those compounds may have a positive effect on the viscosity behaviour of the lacquers produced therewith since, when added to carboxyl groups of component A), they act almost as reactive diluents.

Examples of such compounds are, for example, reaction products of a diglycidyl compound, for example a diglycidyl ether, such as one mol of diglycidyl ether of bisphenol A and one mol of a saturated or unsaturated monocarboxylic acid such as acetic acid, propionic acid or isononanonic acid. Further examples are reaction products of di- or polyepoxides, such as, for example, polyglycidyl ethers based on diethylene glycol, dipropylene glycol, polypropylene glycol having a number-average molecular weight of up to 2000 and triglycidyl ethers of glycerol and/or polyphenols, such as bisphenol A or F, with the mentioned monocarboxylic acids.

Particular preference is given to the glycidyl ester of versatic acid having the commercial product name Cardura E from Shell AG.

When in the application-ready state, the coating compositions according to the invention have a solids content, formed by the resin solid of the binder/crosslinking agent system, the urea compounds D) mentioned below and further non-volatile constituents which may be present, of from 40 to 70 wt. %. As volatile constituents they contain organic solvents, such as are conventionally employed, for example, for the production of coating compositions, for example lacquers. They may also be solvents such as are used in the preparation of the individual components. Examples are glycol ethers, such as butyl glycol, butyl diglycol, dipropylene glycol dimethyl ether, dipropylene glycol monomethyl ether, ethylene glycol dimethyl ether; glycol ether esters, such as ethyl glycol acetate, butyl glycol acetate, 3-methoxy-n-butyl acetate, butyl diglycol acetate, methoxypropyl acetate; esters, such as butyl acetate, isobutyl acetate, amyl acetate; ketones, such as methyl ethyl ketone, methyl isobutyl ketone, diisobutyl ketone, cyclohexanone, isophorone; alcohols, such as methanol, ethanol, propanol, butanol; aromatic hydrocarbons, such as xylene, Solvesso 100 (registered trade mark for a mixture of aromatic hydrocarbons having a boiling range from 155 to 185° C.) and aliphatic hydrocarbons.

The coating compositions according to the invention contain from 0.1 to 3 wt. %, preferably from 0.3 to 2 wt. %, particularly preferably from 0.5 to 1.5 wt. %, based on the resin solids of the coating compositions, of one or more solid urea compounds D) which have previously been prepared in the presence of at least a portion of the epoxy-functional crosslinking agent(s) B) and which are insoluble in the coating composition, as anti-sagging agents, that is to say as agents that have a thixotropic action or bring about intrinsic viscosity, which have an advantageous effect on the sagging behaviour of the coating compositions according to the invention. They effectively prevent undesired running or sagging of coating layers of the coating compositions according to the invention applied to vertical surfaces.

The urea compounds D) are conventional anti-sagging agents, such as, for example, urea compounds known from DE-C-27 51 761, EP-A-0 192 304 and EP-A-0 198 519.

The urea compounds D) are addition products of aromatic, araliphatic, cycloaliphatic or aliphatic diisocyanates and/or polyisocyanates derived therefrom (for example those of the isocyanurate type) and mono- and/or polyamines having primary and/or secondary amino groups. The addition products may be defined low molecular weight compounds or oligomeric or polymeric addition products. Preferred urea compounds D) are those in which polyisocyanate and amine have been reacted in a stoichiometric ratio of from 0.7 to 1.5 primary and/or secondary amino groups per isocyanate group, particularly in a stoichiometric ratio of amino groups to isocyanate groups of from 0.9 to 1.1:1. Special preference is given to the use of addition products of diisocyanates, preferably of aliphatic or cycloaliphatic diisocyanates, and primary amines, preferably primary monoamines, as urea compounds D). The aliphatic or cycloaliphatic diisocyanates are preferably diisocyanates having a symmetrical structure.

The urea compounds D) used in the coating compositions according to the invention are so selected that they are solid, particularly preferably crystalline, substances. The particle sizes of the D) particles are preferably from 0.1 to 20 μm. The solid or crystalline urea compounds D) preferably have a high solidification or melting point, which especially is above the stoving temperatures that prevail during stoving of the coating compositions according to the invention, especially above 80° C., for example from 80 to 250° C. Special preference is given to the use of the adduct formed from 1,6-hexane diisocyanate and benzylamine in a molar ratio of 1:2 as the urea compound D) in the coating compositions according to the invention.

The urea compounds D) can be prepared in the conventional manner by the addition of amines having primary and/or secondary amino groups to polyisocyanates. It is possible to add the amine to the polyisocyanate or the polyisocyanate to the amine, or the reactants are added simultaneously; addition of the amine to the polyisocyanate is preferred. The preparation takes place, for example, at temperatures of from 20 to 80° C. in the presence of at least a portion of the epoxy-functional crosslinking agent(s) B) contained in the coating composition according to the invention, that is to say in the presence of a portion or all of the epoxy-functional crosslinking agent(s) B) present in the coating composition according to the invention. If the coating composition according to the invention contains more than one epoxy-functional crosslinking agent B), the preparation may take place, for example, in one of those epoxy-functional crosslinking agents B). When preparing the urea compounds D) it is advantageous to ensure that the reaction system is mixed thoroughly, for example by vigorous stirring, by the use of a dissolver or by carrying out the addition reaction in or using a rotor-stator unit. The procedure is preferably such that the urea compounds D) that form precipitate or crystallise out as a finely divided solid in the epoxy-functional crosslinking agent component B) or the organic solution thereof (for example in one of the solvents mentioned above for the coating compositions), for example during or after completion of the addition reaction, for example during or after cooling. Such dispersions of urea compounds D) present in the form of a finely divided, preferably crystalline solid in the epoxy-functional crosslinking agent component B) or the organic solution thereof may also be prepared by melting and finely distributing the urea compounds D) in B) and subsequently cooling below the solidification or melting point of the urea compounds D).

It may be advantageous if acid is present in the reaction system during the preparation of the urea compounds D) from amine and polyisocyanate compounds, which takes place in the presence of epoxy-functional crosslinking agent component B) as such or in the organic solution thereof. The content of acid in the reaction medium is then, for example, from 0 to less than 20 mg of KOH/g, based on the resin solids in the reaction medium. Inorganic or organic acids, preferably carboxylic acids, may be used as acids for adjusting the acid number to a value within the indicated range. It is preferred to use carboxyl-functional binder of component A) for adjusting the acid number in the reaction medium. The reaction medium then contains epoxy-functional component(s) B), an appropriate amount of carboxyl-functional component(s) A) for adjusting its acid value in the range indicated above and, optionally, organic solvents.

The content of urea compounds D) in the dispersions of D), B) and, optionally, solvent is generally from 0.5 to 10 wt. %, for example from 1 to 10 wt. %, based on the solids content of epoxy-functional crosslinking agent component B).

The coating compositions according to the invention are preferably prepared by mixing the dispersion of the urea compounds D) in the liquid or organically dissolved epoxy-functional crosslinking agent component B) with the other constituents of the coating composition. For example, the dispersion of the urea compounds D) is first mixed with component A) and the portion of component B) which may still be lacking, before the further constituents are added.

Moreover, there may be used for the coating compositions according to the invention, for example, the urea compounds D), starting materials, processes and process parameters for their preparation and their incorporation into coating compositions described in DE-C-27 51 761, EP-A-0 192 304 and EP-A-0 198 519.

If the coating compositions according to the invention are to be used as pigmented finishing lacquers, for example in the production of the outer finishing layer of a multilayer lacquer coating, then they contain pigments and, optionally, extenders. The pigment/resin solid weight ratio is, for example, in the range from 0.05 to 2:1. Examples of pigments are inorganic and/or organic coloured pigments and/or effect pigments, such as, for example, titanium dioxide, iron oxide pigments, carbon black, azo pigments, phthalocyanine pigments, quinacridone pigments, metallic pigments, for example of titanium, aluminium or copper, interference pigments, such as, for example, titanium-dioxide-coated aluminium, coated mica, graphite effect pigments, lamellar iron oxide, lamellar copper phthalocyanine pigments. Examples of extenders are extenders conventionally employed in lacquers, such as, for example, talcum and silicates.

The coating compositions according to the invention which can be used as pigmented finishing lacquers or, preferably, as transparent clear lacquers may also contain additives conventionally employed in lacquers in amounts conventionally employed in lacquers, for example up to 5 wt. %, based on the total lacquer, for example transparent pigments or extenders, flow agents, colourings, light stabilisers, antioxidants, or further rheology-controlling agents which can be used in addition to the urea compounds D), such as microgels, NAD (=non-aqueous dispersions), compounds yielding formaldehyde at the latest during stoving, catalysts for catalysing the reaction of carboxyl and epoxy groups and/or for catalysing the additional crosslinking which is optionally possible.

The coating compositions according to the invention may be applied by known processes, especially by spraying in layer thicknesses of, for example, from 25 to 60 $\mu$m. After a vaporisation phase, the applied coating composition can be crosslinked by heating. The stoving temperatures are, for example, from 60 to 180° C., preferably from 60 to 160° C.

The coating compositions according to the invention may be used to produce the outer pigmented finishing lacquer layer of a multilayer lacquer coating. In that respect, the present invention relates also to the use of the coating compositions according to the invention as finishing lacquer coating compositions.

The coating compositions according to the invention are preferably formulated as transparent clear lacquers which can be used to produce the outer clear lacquer layer of a multilayer lacquer coating. In that respect, the present invention relates also to the use of the coating compositions according to the invention as clear lacquer coating compositions. For example, the clear lacquer coating composition according to the invention may be applied to a substrate provided with a colouring and/or effect-giving single- or multi-layer pre-coating and stoved. The stoving temperatures of the clear lacquer coating compositions according to the invention are, for example, from 60 to 160° C. For automotive applications they are, for example, from 60 to 140° C., and for applications in the series lacquering of motor vehicles they are especially from 80 to 140° C. and preferably from 110 to 130° C.

The clear lacquer coating compositions according to the invention are preferably used for the production of a base lacquer/clear lacquer multilayer lacquer coating. In that connection, a colouring and/or effect-giving base lacquer layer is applied to an optionally pre-coated substrate, especially to pre-coated motor vehicle bodies or parts thereof, before the clear lacquer coating layer of a clear lacquer coating composition according to the invention is applied and stoved. Examples of pre-coating on motor vehicle bodies or parts thereof are an electrophoretic primer layer, a two-layer pre-coating consisting of an electrophoretic primer layer and a spray filler layer, or a two-layer pre-coating consisting of an electrophoretic primer layer and a second coating layer applied by electrophoresis.

The colouring and/or effect-giving base lacquer layer may be stoved before application of the clear lacquer layer of the clear lacquer coating composition according to the invention, but the clear lacquer coating composition according to the invention is preferably applied by the known wet-on-wet process to the base lacquer layer which determines the colour of the multilayer lacquer coating. In that connection, the base lacquer layer is applied by spraying from a colouring and/or effect-giving aqueous or solvent-based base lacquer in a dry layer thickness that is dependent on the colour, for example from 10 to 25 $\mu$m. Following application of the base lacquer layer, the clear lacquer layer of the clear lacquer coating composition according to the invention is applied, after a brief phase of exposure to air, for example at from 20 to 80° C., by spraying in a dry layer thickness of generally from 25 to 50 μm. The coating may optionally be exposed to air for a short time. The substrate is then fed to the stoving process, in which the clear lacquer coating layer together with the base lacquer layer is stoved at elevated temperatures, for example from 60 to 160° C.

With the present invention it is possible to produce, especially on motor vehicles and parts thereof, multilayer lacquer coatings, especially base lacquer/clear lacquer two-layer lacquer coatings, having an outstanding visual aesthetic effect and good resistance to chemicals and acids. Sagging of the clear lacquer on vertical surfaces during curing, especially during stoving, is effectively prevented.

EXAMPLE 1

(Preparation of a Carboxyl-functional Polyester):
a) Preparation of a hydroxyl-functional polyester oligomer:

1100 g of trimethylolpropane and 899 g of adipic acid are esterified to an acid number of 0.5 mg of KOH/g in the presence of 2 g of hypophosphorous acid at from 180° C. to 240° C. in the melt. The mixture is then diluted with 770 g of butyl acetate.

The product has a baking residue of 64.5 % (1 h, 150° C.) and a hydroxyl number of 390 mg of KOH/g, based on solids content.
b) Carboxyl-functionalisation of the hydroxyl-functional polyester oligomer:

878 g of the product of Example 1a), 622 g of hexahydrophthalic anhydride and 277 g of butyl acetate are heated to 80° C. When the exothermic reaction has subsided, the mixture is heated to 140° C. and the reaction is carried out until the desired acid number is reached. 100 g of epsilon-caprolactone are then added. The reaction is carried out at 140° C. until the theoretical solids content is reached.

The carboxyl-functional polyester resin has a baking residue of 67.7 % (1 h, 150° C.) and an acid number of 190 mg of KOH/g, based on solids content.
Preparation of Urea Dispersions in the Presence of Epoxy-functional Methacrylic Copolymers:

EXAMPLE 2

At room temperature, 836 g of a 69 wt. % solution of an epoxy-functional methacrylic copolymer (monomer weight ratio: 3% tert.-butyl acrylate, 11% butanediol monoacrylate, 17% styrene, 24% ethylhexyl methacrylate, 45% glycidyl methacrylate; number-average molecular weight $(M_n)$= 4000) in a 9:1 mixture of Solvesso 100 (mixture of aromatic hydrocarbons having a boiling range from 155 to 185° C.) and n-butanol are placed in a vessel, and 6.8 g of hexamethylene diisocyanate are added. After homogenisation, 16.5 g of a 50 wt. % solution of benzylamine in n-butanol are metered in, with rapid stirring, in the course of 5 minutes. 30 g of n-butanol are then added, and stirring is continued for one hour at room temperature. A resin solution made milky by urea crystals is obtained.

EXAMPLE 3

At room temperature, 492 g of the 69 wt. % solution of the epoxy-functional methacrylic copolymer of Example 2, 9.6 g of the solution of the carboxyl-functional polyester of Example 1, 24 g of n-butanol and 42.6 g of Solvesso 100 are placed in a vessel, and 4 g of hexamethylene diisocyanate are added. After homogenisation, 9.9 g of a 50 wt. % solution of benzylamine in n-butanol are metered in, with rapid stirring, in the course of 5 minutes. 18 g of Solvesso 100 are then added, and stirring is continued for one hour at room temperature. A resin solution made milky by urea crystals is obtained.

EXAMPLE 4

At room temperature, 492 g of the 69 wt. % solution of the epoxy-functional methacrylic copolymer of Example 2, 9.6 g of the solution of the carboxyl-functional polyester of Example 1, 24 g of n-butanol and 42.6 g of Solvesso 100 are placed in a vessel, and 5 g of benzylamine are added. After homogenisation, 9 g of a freshly prepared mixture of 4 g of hexamethylene diisocyanate and 5 g of n-butanol are metered in, with rapid stirring, in the course of 5 minutes. 18 g of Solvesso 100 are then added, and stirring is continued for one hour at room temperature. A resin solution made milky by urea crystals is obtained.

EXAMPLE 5

At room temperature, 479 g of the 69 wt. % solution of the epoxy-functional methacrylic copolymer of Example 2, 9.6 g of the solution of the carboxyl-functional polyester of Example 1, 24 g of n-butanol and 46.5 g of Solvesso 100 are placed in a vessel, and 8.1 g of hexamethylene diisocyanate are added. After homogenisation, 19.8 g of a 50 wt. % solution of benzylamine in n-butanol are metered in, with rapid stirring, in the course of 5 minutes. 13 g of Solvesso 100 are then added, and stirring is continued for one hour at room temperature. A resin solution made milky by urea crystals is obtained.

EXAMPLE 6

At room temperature, 836 g of a 69 wt. % solution of an epoxy-functional methacrylic copolymer (monomer composition: 3% tert.-butyl acrylate, 11% butyl acrylate, 17% styrene, 24% ethylhexyl methacrylate, 45% glycidyl methacrylate; number-average molecular weight $(M_n)$=3800) in a 9:1 mixture of Solvesso 100 and n-butanol are placed in a vessel, and 6.8 g of hexamethylene diisocyanate are added. After homogenisation, 16.5 g of a 50 wt. % solution of benzylamine in n-butanol are metered in, with rapid stirring, in the course of 5 minutes. 30 g of n-butanol are then added, and stirring is continued for one hour at room temperature. A resin solution made milky by urea crystals is obtained.

EXAMPLE 7

At room temperature, 492 g of the 69 wt. % solution of the epoxy-functional methacrylic copolymer of Example 6, 9.6 g of the solution of the carboxyl-functional polyester of Example1, 24 g of n-butanol and 42.6 g of Solvesso 100 are placed in a vessel, and 4 g of hexamethylene diisocyanate are added. After homogenisation, 9.9 g of a 50 wt. % solution of benzylamine in n-butanol are metered in, with rapid stirring, in the course of 5 minutes. 18 g of Solvesso 100 are then added, and stirring is continued for one hour at room temperature. A resin solution made milky by urea crystals is obtained.

EXAMPLES 8a–k

Production of Clear Lacquers and Production of Multilayer Lacquer Coatings:

With the present invention it is possible to produce, especially on motor vehicles and parts thereof, multilayer lacquer coatings, especially base lacquer/clear lacquer two-layer lacquer coatings, having an outstanding visual aesthetic effect and good resistance to chemicals and acids. Sagging of the clear lacquer on vertical surfaces during curing, especially during stoving, is effectively prevented.

Clear lacquers having the composition indicated in Table 1 are produced.

Metal sheets provided with a cataphoretic primer and a filler layer are each sprayed with a black base lacquer in a dry layer thickness of 16 μm and pre-dried for 10 minutes at 80° C. Clear lacquers 8a–k are each applied to the hanging sheets by spraying in a wedge shape with a layer thickness gradient of from 10 to 60 pm dry layer thickness. After exposure to air for 5 minutes at room temperature, stoving is carried out for 20 minutes at 140° C. (object temperature). The metal sheets are in the vertical position during all the operations.

High-gloss multilayer lacquer coatings are obtained in each case. None of the multilayer lacquer coatings exhibits a visible change in the film (swelling) in the drop test with 10% sulfuric acid (20 minutes, 60° C.).

As well as the composition of the clear lacquers, Table 1, also shows the sagging limit in each case.

TABLE 1

| Constituents (parts by weight) | Clear Lacquers 8 | | | | | | | | | |
|---|---|---|---|---|---|---|---|---|---|---|
| | a | b | c | d | e | f | g | h | i | k |
| A[1] | 48.9 | — | — | — | 22.5 | — | — | — | — | — |
| Resin solution of Example 2 | — | 52.7 | — | — | — | 57.0 | — | — | — | — |
| Resin solution of Example 3 | — | — | 51.8 | — | — | — | 56.0 | — | — | — |
| Resin solution of Example 4 | — | — | — | 54.0 | — | — | — | — | — | — |
| Resin solution of Example 5 | — | — | — | — | 26.4 | — | — | — | — | — |
| Resin solution of Example 6 | — | — | — | — | — | — | — | 53.7 | — | 55.7 |
| Resin solution of Example 7 | — | — | — | — | — | — | — | — | 52.8 | — |
| Resin solution of Example 1 | 20.2 | 18.7 | 18.1 | 18.9 | 18.6 | 20.2 | 19.5 | 19.1 | 18.5 | 20.1 |
| Melamine resin[2] | 7.0 | 6.5 | 6.3 | 6.5 | 6.4 | — | — | 5.0 | 5.0 | — |
| Light stabilizer[3] | in each case 2.0 | | | | | | | | | |
| Flow agent[4] | in each case 0.5 | | | | | | | | | |
| Benzylhexiformal[5] | — | — | — | — | — | 1.0 | 1.0 | — | — | 1.0 |
| Methoxypropanol | in each case 4.5 | | | | | | | | | |
| Dipropylene glycol dimethyl ether | in each case 2.5 | | | | | | | | | |
| Butanol | in each case 4.5 | | | | | | | | | |
| Solvesso 100 | 9.9 | 8.1 | 9.8 | 6.6 | 12.1 | 7.8 | 9.5 | 8.2 | 9.7 | 9.2 |
| Clear lacquer sagging limit (μm) | 33 | >60 | 55 | 56 | 55 | >60 | 55 | >60 | 54 | 58 |

[1]69 wt. % solution of the (meth)acrylic copolymer with epoxy groups of Example 2
[2]butylated melamine resin, 70 wt. % in butanol
[3]1:1 mixture of a benxtriazole derivative and a sterically hindered amine (HALS type)
[4]silicone oil
[5]Preventol D2 from Bayer

What is claimed is:

1. Coating compositions containing a binder/crosslinking agent system, one or more organic solvents, anti-sagging agents and, optionally, pigments and/or extenders wherein the binder/crosslinking agent system contains from 20 to 80 wt. % of one or more carboxyl-functional components A) selected from the group consisting of carboxyl-functional (meth)acrylic copolymers, carboxyl-functional polyesters, and mixtures thereof the carboxyl functionality of which corresponds in each case to an acid number of from 20 to 300 mg of KOH/g, and from 20 to 80 wt. % of one or more epoxy-functional crosslinking agents having at least two epoxy groups per molecule B), the percentages by weight of A) and B) adding up to 100 wt. %, from 0 to 30 wt. % of one or more polymer polyols C), based on the sum of the weights of components A) and B), from 0 to 20 wt. % of one or more further crosslinking agents E) other than A), B) and C), based on the sum of the weights of A), B) and C), from 0 to 10 wt. % of one or more monoepoxides F), based on the sum of the weights of A) and B), and as anti-sagging agents, from 0.1 to 3 wt. %, based on the resin solids, of one or more solid, finely divided urea compounds D) which have previously been prepared in the presence of at least a portion of the epoxy-functional crosslinking agent(s) B) and which are insoluble in the coating composition, all percentages by weight being based in each case on the solids.

2. Coating compositions according to claim 1, characterised in that the preparation of the finely divided urea compounds D) is carried out by reacting amine and isocyanate compounds in the presence of at least a portion of the epoxy-functional crosslinking agents B) and, optionally, of organic solvent.

3. Coating compositions according to claim 1, characterised in that the preparation of the finely divided, solid urea compounds D) is effected by melting and finely distributing the urea compounds D) in at least a portion of the crosslinking agent component B) and, optionally, of organic solvent, and subsequently cooling below the solidification or melting point of the urea compounds D).

4. Coating compositions according to claim 1, characterised in that the urea compounds D) are prepared in such an amount in component B) and, optionally, solvent that the content of urea compounds D) in the resulting dispersions is from 0.5 to 10 wt. %, based on the solids content of epoxy-functional crosslinking agent component B).

5. Coating compositions according to claim 1, characterised in that the solid urea compounds D) have particle sizes of from 0.1 to 20 μm.

* * * * *

UNITED STATES PATENT AND TRADEMARK OFFICE
CERTIFICATE OF CORRECTION

PATENT NO. : 6,437,056 B1
DATED : August 20, 2002
INVENTOR(S) : Dahm et al.

It is certified that error appears in the above-identified patent and that said Letters Patent is hereby corrected as shown below:

<u>Title page,</u>
Item [73], Assignee, "du Pont de Nmeours" has to be replaced by
-- du Pont de Nemours --
Item [57], ABSTRACT,
Line 4, should read -- crosslinking -- instead of "crosslinkin"
Line 22, should read -- coating composition -- instead of "coating compositions".

<u>Column 6,</u>
Line 20, should read -- 0 ºC -- instead of "0C"

<u>Column 14,</u>
Delete lines 61 to 67.

Signed and Sealed this

Fourth Day of March, 2003

JAMES E. ROGAN
*Director of the United States Patent and Trademark Office*